124,718

UNITED STATES PATENT OFFICE.

JOHN M. CANTRELL, OF POLK COUNTY, OREGON.

IMPROVEMENT IN MEDICAL COMPOUNDS OR RHEUMATIC LINIMENTS.

Specification forming part of Letters Patent No. 124,718, dated March 19, 1872.

SPECIFICATION.

I, JOHN M. CANTRELL, of Polk county, State of Oregon, have invented a certain Compound called Cantrell's Rheumatic Liniment.

The nature of my invention consists in mixing copperas, camphor gum, clarified fish-oil, turpentine, lavender, and bergamot, and dissolved in hot water.

To prepare the compound (Cantrell's Rheumatic Liniment) I take two pounds of copperas; six ounces gum camphor; one-half gallon clarified fish-oil; one quart of spirits turpentine; two ounces lavender and bergamot, mix equal parts; and one gallon of water, and mix and boil five hours, which, after such mixture is cooled, is ready to be used upon mankind and beast for the cure of rheumatism, sprains, pains or bruises. I apply the liniment by rubbing the same on the skin of the parts affected with the hand.

*Claim.*

I claim as my invention—

The manufacture or preparation of a compound, which I denominate Cantrell's Rheumatic Liniment, of the ingredients, in the proportions, and for the purposes set forth.

JOHN M. CANTRELL.

Witnesses:
BUSHROD W. WILSON,
JAMES A. YANTIS.